Patented Jan. 11, 1938

2,104,829

UNITED STATES PATENT OFFICE 2,104,829

TINTED RESINS

William H. Carmody, Pittsburgh, Pa.

No Drawing. Application January 19, 1935,
Serial No. 2,587. Renewed April 20, 1937

4 Claims. (Cl. 260—7)

This invention relates to the intentional and controlled tinting of coal derivative resins, such as coumarone-indene resin and cyclopentadiene resin.

In my co-pending application Serial No. 1,897, filed January 15, 1935, I advanced a theory as to the cause of yellowing in coumarone-indene resin, which theory describes, as the cause of yellowing, the development of fulvene at the cyclopentadiene structure in the terminal indene unit of the indene polymer. In proof of that theory, I caused intentionally an intensified and accelerated fulvene development in solutions of coumarone-indene resin, by a color reaction of aldehydes and ketones with the coumarone-indene resin.

The object of this invention is to effect a selective and controlled pretinting of coumarone-indene resin and cyclopentadiene resin, and particularly the former, to produce commercially usable resins having specific and typical colorations produced by the fulvene development peculiar to the reaction of the resin with the appropriate aldehydes and ketones.

By such color reaction, I am able so to pretint the resins as to give them an attractive coloration for use in various specific coating compositions. For example, I am able so to develop fulvene coloration in coumarone-indene resin that the resin may impart, without heat treatment, and without the addition of other resin, to an otherwise clear coating composition comprising the coumarone-indene resin, a golden-yellow coloration. Also I am enabled to impart to coumarone-indene resin by a particular fulvene development therein, a brownish-yellow coloration capable of imparting, in itself, to an otherwise clear coating composition a brownish stain effect.

Briefly, my invention, insofar as it relates to coumarone-indene resin, is, for particular purposes, to take advantage of fulvene development in the resin, which leads to the generally considered deleterious yellowing quality of the resin.

Having noted in the literature the fact that cyclopentadiene, and the indene monomer, are capable of closely similar color reactions with aldehydes and ketones, I predicated the fact that there should be in the indene polymer a cyclopentadiene structure capable of resulting, by fulvene development, in the typical color reactions. In proving the theory, I actually conducted color reactions between the indene polymer as comprised in coumarone-indene resin, and both aldehydes and ketones. I have also discovered and recognized the fact that such reactions are capable of producing specially and attractively tinted, commercially usable, coumarone-indene resin.

The mechanism of producing a fulvene of the indene polymer may be illustrated by the following formula:

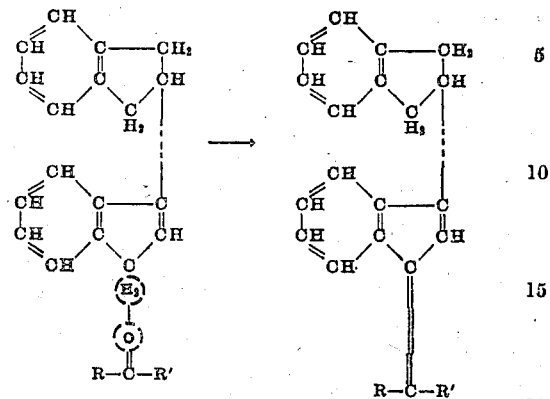

In the formula it will be noted that it is the terminal indene unit alone which enters into the color reaction consisting in a fulvene development. In the formula "R" and "R'" represent either hydrogen, or "alkyl", or "aryl". The reaction, as shown, is general, therefore, to either an aldehyde or ketone, and involves the formation and elimination of water in the methylene group of the cyclopentadiene structure with the formation of the typical fulvene structure. Relating the color reaction to the formula, it is the chemical composition of R and/or R' which determines the specific coloration which results from the fulvene color reaction.

To effect the fulvene color development, a solution of coumarone-indene resin in a suitable solvent is used. For this purpose any aromatic solvent which accompanies the coumarone-indene constituents of crude solvent naphtha is suitable. To this solution there is added the aldehyde or ketone reactive with the resin polymer, and a small quantity of sodium hydroxide, desirably in alcohol solution, is added as a catalyst. Assuming that the coloration is performed upon coumarone-indene resin, it is desirable to utilize quantitively one mol., or less, of the color reagent, either aldehyde or ketone, to each mol. of indene polymer, making a rough approximation as to the indene content of the coumarone-indene resin. It is desirable in most instances that this approximation may be made, and that the reagent be limited quantitively in order that there may not be included in the tinted resin, polymers of the aldehyde or ketone, as such, in any large proportion. I have noted that, an excess of an aldehyde or ketone being used, there is a marked tendency toward polymerization of these reagents in themselves.

It may be stated generally that it is desirable to employ a slight deficiency, rather than an excess, of the aldehyde or ketone color reagent. By utilizing a molar deficiency of the aldehyde or ketone, the contaminating side color reaction resulting from polymerization of the reagent can be minimized or wholly prevented.

As typical illustrative examples of the fulvene color reaction with coumarone-indene resin, I may give the following, it being understood that in each instance a clear, and complete, solution of the resin is employed, and that sodium hydroxide in small quantity is used as a catalyst:

Example No. 1

Adding acetone, $CH_3$—$CO$—$CH_3$, in slightly less than molar proportions with the resin causes the resin solution to develop a relatively deep brownish-yellow coloration. This is the effect of the formation of a typical fulvene structure at the terminal indene unit of the various indene polymers of the resin. By adding the acetone in excess of molar proportions the reaction coloration is accompanied by a deep brown coloration, the result of a side reaction which may conceivably be a polymerization of the acetone. Upon standing there is a color stratification, with the deeper colored compound, caused by side reaction, settling to the bottom of the reaction vessel.

From the viewpoint of complete solubility in a resin intended as a varnish resin, or for other use in coating compositions, it is clearly desirable that the products of side reaction, or reactions, should not be included in the resin. The fulvene color reaction, if allowed adequately to proceed, is sufficient to give a relatively deep brownish coloration to the resin.

This is a good typical example of a fulvene color reaction conducted on the indene polymer utilizing a ketone as the reagent. The fulvene color reaction which occurs between the indene polymer and the acetone may be best expressed by the following structural formula:

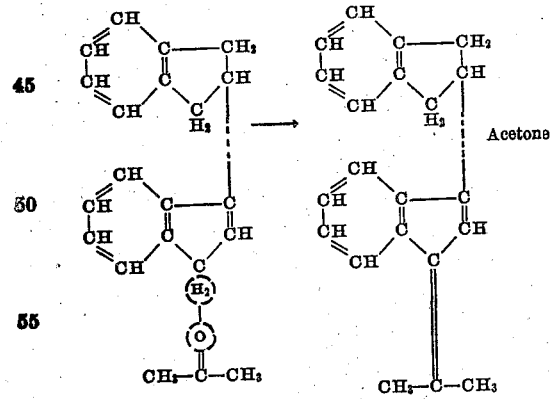

Example No. 2

A good example of resin color reaction produced by utilizing an aldehyde as the reagent, is obtained by adding acetaldehyde, $CH_3$—$CHO$, to the solution of coumarone-indene resin. If the acetaldehyde be added to the solution in slightly less than molar proportion, the solution assumes a bright reddish-yellow coloration, with but little variation in coloration throughout the solution. If an excess of acetaldehyde be employed, the reddish-yellow coloration of the solution takes place, but is accompanied by a deep cherry-red coloration. Upon settling, there is a stratification with the deeper and more reddish color appearing in the lower stratum of the solution. This darker coloration, which it is desirable to avoid, is quite clearly the result of aldehyde polymerization, while the useful coloration, appearing in the upper stratum of the solution, is a clear reddish-yellow, or yellowish-red.

The fulvene color reaction which occurs between the indene polymer and the acetaldehyde may be best expressed by the following structural formula:

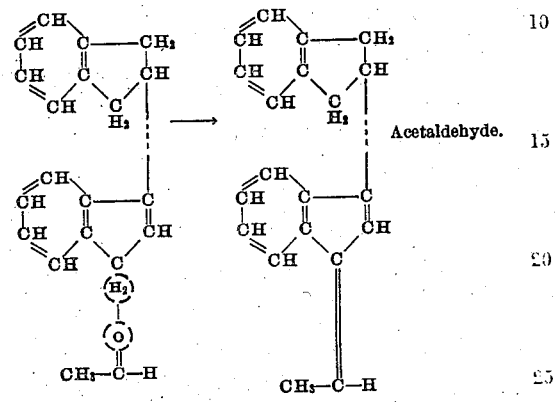

Example No. 3

Another typical aldehyde-produced fulvene coloration reaction is obtained by using furfural $(CH)_3OC$—$COH$. This reagent gives, as the result of the fulvene color reaction, a solution of a brilliant cherry-red, more intense than that obtained by the use of acetaldehyde, assuming that in each slightly less than molar proportions of the reagent are employed. Irrespective of the relative molar proportions of indene and furfural, the solution rapidly becomes opaque before, or upon, completion of the reaction. I have observed, however, that the opaque bodies rapidly precipitate and collect in the lower stratum of the solution. These bodies are furfural resin polymers, which are merely an incident to the color reaction, and which are discarded as a waste product. It is, of course, desirable to utilize less than molar proportions of the furfural with respect to the indene polymer, in order quantitively to limit the formation of the waste furfural resin.

The fulvene color reaction which occurs between the indene polymer and the furfural may be best expressed by the following structural formula:

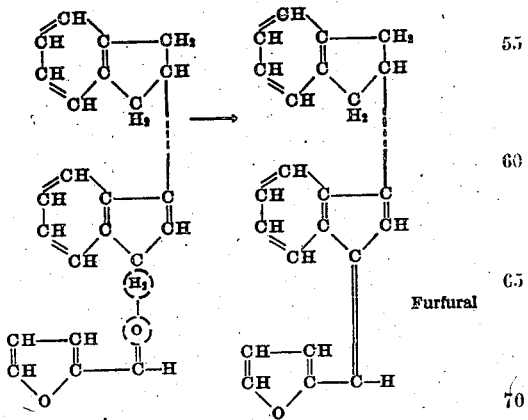

In effecting a furfural coloration of the coumarone-indene resin, as in the other examples, if an excess of the reagent be used, the lower stratum in the treating vessel comprises the sodium hydroxide solution, in which there collects such products as are formed by side reaction, or by polymerization of the reagent. In any such case the overlying coumarone-indene resin is separated by decantation from the sodium hydroxide stratum. This, of course, is done whether or no there be colored products in that stratum.

Upon recovery of solid resin by distillation of the solvent, the hard resin recovered has the coloration effected by the fulvene color reaction. Care being taken either to prevent side reactions, or to remove the fulvene colored resin free from contamination by the products of side reaction, or reagent polymerization, a specifically colored hard coumarone resin is obtained.

It should be understood that the color reaction may be effected during the manufacture of the coumarone-indene resin. While the general process of making coumarone-indene resin is well-known, it may be briefly and generally here summarized, in order to explain the introduction of the colorizing step in the general process.

In the manufacture of coumarone-indene resin, crude solvent naphtha, or generally equivalent liquid containing the coumarone-indene polymerizables, is subjected, under controlled conditions of temperature and agitation, to the polymerizing effect of a suitable catalyst. Sulfuric acid is the usual catalyst employed. After polymerization, and after separation of the liquid containing the polymers from the acid sludge consisting of sulphonates and products of extreme stages of polymerization, the liquid containing the polymers is treated to neutralize and remove traces of remaining free acid. An alkali, such as sodium hydroxide or sodium carbonate, is commonly employed for that purpose.

If then a slight excess of the alkaline reagent over that necessary to neutralize traces of sulphuric acid is used, the resin solution is in condition for the performance of the fulvene color reaction therein, by addition of the desired aldehyde or ketone thereto. The coloration of the resin may thus be conducted as a step in the method of manufacturing the resin, and without the expense incident to a separate and wholly additional procedure.

I have noted, as an incident of coumarone-indene manufacture, that if an excess of alkali be present after neutralizing treatment of coumarone-indene resin, the phenomenon of after-yellowing in the resin is accelerated. Assuming that after-yellowing occurs through the intermediate agency of aldehydes and/or ketones produced in the resin by the action of oxygen thereon, it becomes apparent that fulvene development in the resin, by reaction of the aldehyde, or ketone, at the point of the indene molecule available for such reaction, is accelerated by inclusion in the resin of a typical catalyst for promoting the fulvene color reaction.

The fulvene color reaction occurring between the indene polymer and an aldehyde or ketone takes place with reasonable rapidity at normal room temperature. It is possible to accelerate the reaction by heating the reaction solution very gently. Any temperature elevation above normal room temperature cannot, however, be considered even a commercial necessity for the process.

The fulvene color reaction may be obtained generally by utilizing any aldehyde or ketone. The examples given above are, however, illustrative of the use of aldehydes and ketones which I have found to be practical. Benzaldehyde, $C_6H_5$—CHO, for example, polymerizes in the presence of a suitable alkali catalyst, such as sodium hydroxide or sodium carbonate, so rapidly that the aldehyde polymerization keeps ahead of the fulvene reaction to such an extent that the color effect of the fulvene reaction is substantially retarded. The result is, therefore, an inordinate production of waste polymers as compared with the desired fulvene coloration effected in the coumarone-indene resin. I have used formaldehyde, H—CHO, to produce the fulvene color reaction in coumarone-indene resin, utilizing a 40% solution of the formaldehyde. This reaction, however, is inefficient, for the reason that the presence of the water tends to cause the formaldehyde to remain in the layer or globules of water, rather than to distribute reactively through the resin solution.

All the color reactions above described with respect to coumarone-indene resin, are applicable to cyclopentadiene resin. In the case of cyclopentadiene resin, the color effect is intensified as compared with coumarone-indene resin. The probable reason for this intensification can be illustrated by the following formula, giving structurally the product of reaction between acetone and the cyclopentadiene polymer:

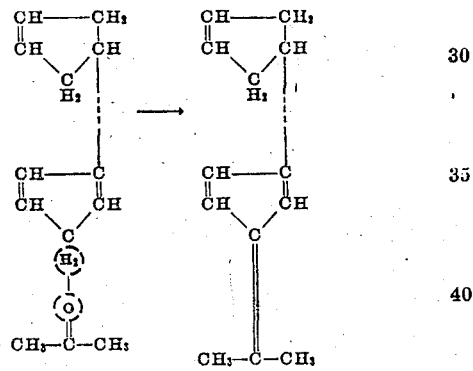

It will be seen from the formula that in the case of cyclopentadiene the fulvene structure exists unmodified by the presence of the aromatic nucleus, which forms part of the terminal indene unit of an indene polymer, and which includes one double bond existing in the cyclopentadiene nucleus of the fulvene structure. In effect my intentional, and controlled, coloration of coumarone-indene resin, by promoting the fulvene color reaction in the resin, is the converse of the desired result disclosed in my above-noted co-pending application. In that other application the desired result was the prevention of the fulvene reaction in coumarone-indene resin; herein it is the intensification of such reaction, to produce a specifically and deeply tinted resin, which is the result here desired.

I claim as my invention:

1. The herein described step in the method of pretinting a resin comprising in its individual polymers a reactive cyclopentadiene structure, which consists in reacting at least one compound selected from the classes of aldehydes and ketones with the resin in the presence of an alkaline catalyst to produce development of the fulvene color structure therein.

2. The herein described step in the method of pretinting a coumarone-indene resin comprising in its indene polymers a reactive cyclopentadiene structure, which consists in reacting at least one compound selected from the classes of aldehydes and ketones with the coumarone-indene resin in the presence of an alkaline catalyst to produce development of the fulvene color structure therein.

3. The herein described method of pretinting a resin comprising in its individual polymers a reactive cyclopentadiene structure, which comprises preparing a solution of the resin polymers, reacting at least one compound selected from the classes of aldehydes and ketones with the resin in the presence of an alkaline catalyst to produce development of the fulvene color structure therein, and recovering the fulvene tinted resin free from the products of side reactions and polymerizations.

4. The herein described method of pretinting a coumarone-indene resin comprising in its individual indene polymers a reactive cyclopentadiene structure, which comprises preparing a solution of the resin polymers, reacting at least one compound selected from the classes of aldehydes and ketones with the resin in the presence of an alkaline catalyst to produce development of the fulvene color structure therein, and recovering the fulvene tinted resin free from the products of side reactions and polymerizations.

WILLIAM H. CARMODY.